(12) United States Patent
Moriyama et al.

(10) Patent No.: US 8,256,795 B2
(45) Date of Patent: Sep. 4, 2012

(54) OFF-ROAD TRUCK SUSPENDED WITH RUBBER SPRING DEVICE

(75) Inventors: Tomoyuki Moriyama, Ibaraki (JP);
Minoru Tazawa, Ibaraki (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/384,959

(22) PCT Filed: May 23, 2011

(86) PCT No.: PCT/JP2011/061717
§ 371 (c)(1),
(2), (4) Date: Jan. 19, 2012

(87) PCT Pub. No.: WO2012/002064
PCT Pub. Date: Jan. 5, 2012

(65) Prior Publication Data
US 2012/0119464 A1 May 17, 2012

(30) Foreign Application Priority Data
Jun. 30, 2010 (JP) .................................. 2010-149241

(51) Int. Cl.
*B60G 5/00* (2006.01)
*B60G 5/04* (2006.01)
*F16F 1/40* (2006.01)
(52) U.S. Cl. .................. 280/681; 280/124.177; 280/687; 267/140.3; 267/141.1

(58) Field of Classification Search ........... 280/124.116, 280/124.128, 676, 677, 681, 682, 687, 124.177, 280/124.178; 267/140.2, 140.3, 140.4, 140.5, 267/141, 141.1, 141.2, 141.3, 141.4, 141.5, 267/141.6, 141.7
See application file for complete search history.

(56) References Cited

U.S. PATENT DOCUMENTS

| 2,872,207 | A | * | 2/1959 | Hirst | 280/687 |
| 3,233,560 | A | * | 2/1966 | Beck | 105/136 |
| 3,471,165 | A | * | 10/1969 | Raidel | 280/687 |
| 3,528,680 | A | * | 9/1970 | Nelson | 280/678 |
| 4,213,633 | A | * | 7/1980 | Moore | 280/124.109 |
| 4,615,513 | A | * | 10/1986 | Thaung et al. | 267/292 |

(Continued)

FOREIGN PATENT DOCUMENTS

| CA | 2 347 557 A1 | 4/2000 |
| GB | 2 342 975 A | 4/2000 |
| JP | 5-338552 A | 12/1993 |
| JP | 2002-527702 A | 8/2002 |
| JP | 2006-57833 A | 3/2006 |
| JP | 2007-333052 A | 12/2007 |
| WO | 00/23725 | 4/2000 |

OTHER PUBLICATIONS

International Search Report mailed Aug. 2, 2011 from International Application No. PCT/JP2011/061717, 4 pages. Notice of Allowance mailed Nov. 8, 2011 in Japanese Patent Application No. 2010-149241, including verified English translation, 7 pages.

*Primary Examiner* — Joseph Rocca
(74) *Attorney, Agent, or Firm* — Fish & Richardson P.C.

(57) ABSTRACT

A rubber spring device is formed by alternately laminating a plurality of layers of hard plates whose linear dimension W in a direction parallel to the longitudinal direction of each equalizer bar is shorter in plan view than a linear dimension H in a direction parallel to an axle direction, and rubber layers. The rubber spring device is disposed between an end portion of each equalizer bar and a center axle in an articulated dump truck, and is allowed to function as a suspension. Thus, even when the rubber spring device is deformed into an accordion shape, peak positions of an internal stress within each rubber layer can be dispersed and reduced, thereby preventing generation of cracks within each rubber layer.

10 Claims, 7 Drawing Sheets

U.S. PATENT DOCUMENTS

| | | | |
|---|---|---|---|
| 4,733,855 A * | 3/1988 | Balczun et al. | 267/294 |
| 5,014,474 A * | 5/1991 | Fyfe et al. | 52/167.8 |
| 5,452,548 A * | 9/1995 | Kwon | 52/167.8 |
| 5,676,356 A * | 10/1997 | Ekonen et al. | 267/294 |
| 5,971,425 A * | 10/1999 | Dinsley et al. | 280/678 |
| 6,443,439 B1 | 9/2002 | Newman | |
| 6,511,037 B1 * | 1/2003 | Newman | 248/609 |
| 6,921,097 B2 * | 7/2005 | Ohlsson | 280/124.109 |
| 7,201,367 B2 * | 4/2007 | Wietharn | 267/141 |
| 7,731,211 B2 * | 6/2010 | Ramsey | 280/124.131 |
| 7,856,766 B2 * | 12/2010 | Takenoshita et al. | 52/167.8 |
| 2010/0007069 A1 * | 1/2010 | Kawada | 267/140.3 |

* cited by examiner

OFF-ROAD TRUCK SUSPENDED WITH RUBBER SPRING DEVICE

CROSS-REFERENCE TO RELATED APPLICATIONS

This application claims priority to Application No. PCT/JP2011/061717 filed May 23, 2011, which application claims priority to Japanese Application No. 2010-149241 filed on Jun. 30, 2010. The entire contents of the above applications are incorporated herein by reference in their entireties.

TECHNICAL FIELD

The invention relates to an off-road truck suspended with a rubber spring device serving as a suspension that receives a compressive load, a tensile load, a bending load, a shear load, or the like.

BACKGROUND ART

Figure 9:
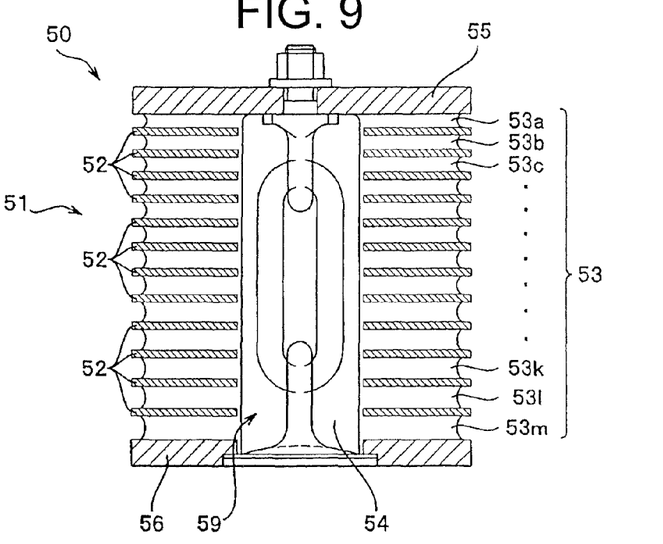
FIG. 9 is a longitudinal sectional view of a rubber spring device. (Related Art 1)
FIG. 10 are explanatory diagrams each showing a stress state when a rubber spring device is deformed into an accordion shape. (Related Art 1)
FIG. 11 are explanatory diagrams each showing a stress state when a rubber spring device is deformed into an accordion shape. (Embodiment)

Rubber spring devices have been conventionally used as a suspension for an off-road truck. As an example of the rubber spring devices, a rubber spring device disclosed in Patent Document 1 according to the applicant of the invention is proposed. The rubber spring device disclosed in Patent Document 1 is cited as Related Art 1 of the invention. FIG. 9 shows a front view of the rubber spring device according to Patent Document 1.

In a rubber spring device 50 shown in FIG. 9, a columnar laminated structure 51 is formed by alternately laminating a plurality of layers of hard plates 52 and rubber layers 53 (53a to 53m) between a pair of rigid end members 55, 56. A columnar cavity portion 54 penetrating in the laminating direction is formed in a central portion of the laminated structure 51. Connecting means 59 for connecting the pair of rigid end members 55, 56 is provided in the cavity portion 54.

The rubber layer 53m disposed on the side of the rigid end member 56 is formed with a thickness greater than that of the rubber layer 53a disposed on the side of the rigid end member 55.

That is, the rubber layers 53a to 53m in a middle portion of the laminated structure 51 are formed to gradually decrease in thickness stepwise toward the side of the rigid end member 55 from the side of the rigid end member 56, i.e., toward the thickness of the rubber layer 53a disposed on the side of the rigid end member 55 from the thickness of the rubber layer 53m disposed on the side of the rigid end member 56. Such a structure makes it possible to generate a substantially uniform stress in a low stress state in each of the rubber layers 53a to 53m, even when the rubber spring device 50 is deformed into an accordion shape.

CITATION LIST

Patent Document
   Patent Document 1: Japanese Patent Application Laid-Open No. 2007-333052

SUMMARY OF THE INVENTION

Problems to be Solved by the Invention

The rubber spring device 50 disclosed in Patent Document 1 exhibits an excellent effect that the stress generated in each of the rubber layers 53a to 53m is a substantially uniform stress in a low stress state, even when the rubber spring device 50 is deformed into an accordion shape. That is, when the rubber spring device 50 is deformed into an accordion shape, a variation in stress distribution in the vertical direction of the laminated structure 51 can be reduced.

Incidentally, when the rubber spring device is deformed into an accordion shape, not only such a simple deformation that a folding fan is unfolded, specifically, a bending deformation, a compressive deformation, or a tensile deformation, but also a deformation in a shearing direction in which upper and lower members shift in the horizontal direction is generated in the laminated structure constituting the rubber spring device in longitudinal sectional view. In other words, in addition to a stress distribution in the vertical direction of the laminated structure, a stress distribution in the shearing direction or the like are generated also in the radial direction of the laminated structure. When the rubber spring device is deformed into an accordion shape, an internal stress is generated due to a tensile force and a compressive force as well as a shearing force, a bending force, or the like also in the middle portion in the radial direction of the laminated structure.

The internal stress in the radial direction of the laminated structure will be described with reference to FIG. 10. In addition to a shear stress, a tensile stress, a compressive stress, a bending stress, or the like act as an internal stress in the radial direction of a laminated structure 81.

Figure 10:
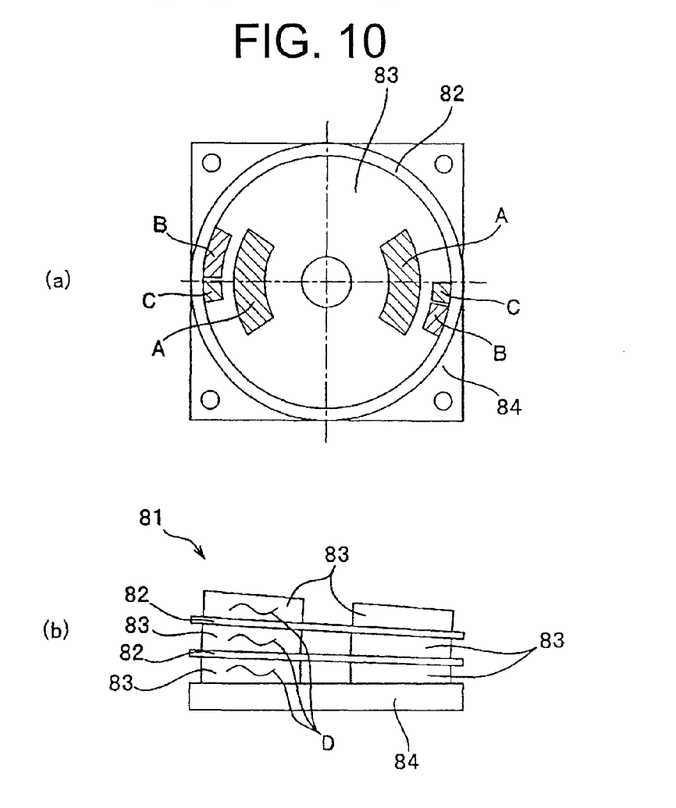

FIG. 10 show a stress state in a middle portion of each rubber layer 83 in the radial direction of the laminated structure 81 in the case where the laminated structure 81, which is formed using hard plates 82 each having a circular shape in plan view, is deformed into an accordion shape. That is, when the laminated structure 81 is deformed into an accordion shape as in the state shown in FIG. 10(b), internal stress peaks occur in regions of "A" areas as shown in FIG. 10(a). Furthermore, when the internal stress is excessively large, cracks D are generated in the middle portion in the radial direction of each rubber layer 83.

Note that FIG. 10(b) shows the structure of the substantial part of the laminated structure 81 on the side of one rigid end member 84.

Thus, it is obvious that the origins of the cracks generated inside each rubber layer 83 are concentrated in the regions of "A" areas. The state of the internal stress illustrated in FIG. 10 is obtained as a calculation result of the stress state in each rubber layer 83 by using a finite element method.

In a rear vehicle body of an off-road truck including middle wheels and rear wheels, for example, when the middle wheel on one side and the rear wheel on the other side in the horizontal direction of the vehicle body run on a block disposed on a road, maximum expansion or maximum compression is generated in regions indicated by "B" areas in each rubber layer 83. Also, when the right and middle wheels or the right and left rear wheels run on the block, maximum expansion or maximum compression is generated in regions indicated by "C" areas in each rubber layer 83.

It remains unknown why the internal stress peaks occur and the origins of cracks are concentrated in the regions of "A" areas in each rubber layer 83. However, if a rubber structure considered as described below is taken into consideration, the reason that the origins of the cracks are concentrated can be estimated.

Rubber is considered as an aggregate of a number of polymer chains. A random coil formed of a single polymer chain has a meandering shape when no force is applied. It is considered that a meandering random coil is entangled with another meandering random coil, so that rubber is formed as an aggregate of multiple polymer chains that are intricately entangled with each other as a whole. It is also considered that meandering random coils are connected to each other at cross-link points.

It is considered that a state in which polymer chains form a meandering random coil is a stable state. When a stress is applied to rubber, for example, when a tensile force is applied to a meandering polymer chain, the meandering polymer chain is formed into a straight shape and is expanded in the direction in which the force is applied.

At this time, it is considered that even when a tensile force is applied to the rubber, the applied tensile force does not entirely act on both ends of each random coil, but acts on some of a number of polymer chains in unspecified locations. As a result, a part of the polymer chains are expanded, and the expanding movement is transmitted to other entangled polymer chains where a deformation is generated. The force acting on the rubber is considered to be transmitted in this manner.

Further, when the polymer chains are expanded forcibly and rapidly, a temperature rise occurs. Accordingly, when heat is applied to the expanded polymer chains, the polymer chains can be restored into the meandering random coil state which is the stable state. That is, it is necessary to absorb heat from the surrounding area in order to restore the expanded polymer chains into the meandering random coil state which is the stable state.

FIG. 10 will be described based on this rubber structure. When the left-side area from the center of the laminated structure 81 in FIG. 10(a) is focused, the outer peripheral side of each rubber layer 83 is pulled in the expanding direction with a strong force by each hard plate 82. On the other hand, the inner peripheral side of each rubber layer 83 is also pulled by each hard plate 82, but a tensile force smaller than that on the outer peripheral side acts. Also in the middle portion in the radial direction of each rubber layer 83, a tensile force is generated by each hard plate 82.

At this time, it is considered that on the outer peripheral side of each rubber layer 83, a number of polymer chains are formed into a straightened shape, and each of surrounding polymer chains is deformed so as to promote deformation into the straightened shape. It is also considered that the deformation of the surrounding polymer chains is used to untangle the entangled points of the polymer chains, which results in a deviation in the position of a part of the polymer chains.

Also in the middle portion in the radial direction of each rubber layer 83, a part of the polymer chains existing in the middle portion are deformed to be straightened by the tensile force generated by each hard plate 82, and the surrounding polymer chains are deformed so as to promote the deformation into the straight shape. However, the force for generating deformation of the surrounding polymer chains is not greater than the force acting on the outer peripheral side of each rubber layer 83.

For this reason, in the middle portion in the radial direction of each rubber layer 83, a distribution is generated in which the magnitude of the stress for deforming the surrounding polymer chains gradually decreases toward the middle portion from the outer peripheral side of each rubber layer 83. The force acting on the rubber is not uniformly transmitted in the radial direction of each rubber layer 83. Further, when the polymer chains are expanded forcibly and rapidly, a temperature rise occurs, but the temperature rise due to heat generation on the outer peripheral side or internal peripheral side of each rubber layer 83 is reduced by an ambient air.

However, the temperature rise generated in the middle portion of each rubber layer 83 is held in the middle portion of each rubber layer 83, so that the heat is transmitted to the surrounding polymer chains. In the middle portion of each rubber layer 83, to which the heat is applied, there are a number of polymer chains that are to be restored to the stable state in which the polymer chains are not expanded but are meandering.

As described above, it is considered that in the "A" areas within each rubber layer 83, a force for untangling the entangled points of the polymer chains, a force for disconnecting a linkage at each cross-link point, and a force for restoring polymer chains expanded due to generated heat into a meandering state act and the internal stress is increased, with the result that cracks are easily generated. Thus, it is estimated that the origins of cracks are concentrated in the regions of the "A" areas within each rubber layer 83.

However, in the rubber spring device 50 disclosed in Patent Document 1, no countermeasure has been taken against the stress distribution generated in the radial direction of the laminated structure 51 and the concentration of the origins of cracks.

The invention further improves the invention disclosed in Patent Document 1, and has an object to provide an off-road truck suspended with a rubber spring device capable of preventing generation of local cracks in the middle portion in the radial direction of each rubber layer and improving the durability, even when the rubber spring device is deformed into an accordion shape.

Means for Solving the Problems

The object of the invention can be achieved by the inventions set forth in claims 1 to 7.

That is, a main characteristic of the invention is an off-road truck suspended with a rubber spring device for suspension between an equalizer bar and an axle, the rubber spring device including: a laminated structure formed by alternately laminating a plurality of layers of rubber layers and hard plates with rigidity in parallel to each other; a pair of rigid end members respectively bonded to the rubber layers disposed at both ends of the laminated structure; and connecting means for regulating widening of an interval between the rigid end members, in which:

in plan view, each of the hard plates in a direction parallel to a longitudinal direction of the equalizer bar is formed to have a linear dimension that is shorter than a linear dimension of each of the hard plates in a direction parallel to an axle direction of the off-road truck; and in plan view, a central line that divides the laminated structure disposed in parallel to the axle direction passes through the hard plates.

Further, a main characteristic of the invention is that an outer peripheral shape of each of the rubber layers in plan view is analogous to an outer peripheral shape of each of the hard plates.

Furthermore, a main characteristic of the invention is that the rubber layer disposed on one end of the laminated structure is formed to have a thickness greater than that of the rubber layer disposed on the other end, and that the rubber layers in a middle portion of the laminated structure are formed to gradually decrease in thickness stepwise from a thickness on the one end side toward a thickness on the other end side.

Furthermore, a main characteristic of the invention is that each of the rubber layers in the laminated structure is formed to have the same thickness.

Furthermore, a main characteristic of the invention is that the off-road truck is an articulated dump truck.

Effects of the Invention

According to the invention, in the middle portion in the radial direction of each rubber layer, regions where the origins of cracks are concentrated can be dispersed and reduced in size. That is, the shape of each hard plate in plan view is formed such that the linear dimension of each hard plate in the direction parallel to the longitudinal direction of the equalizer bar is set to be shorter than the linear dimension of each hard plate in the direction parallel to the axle direction of the off-road truck. In addition, the central line that divides the laminated structure disposed in parallel to the axle direction passes through each hard plate in plan view.

Figure 11:
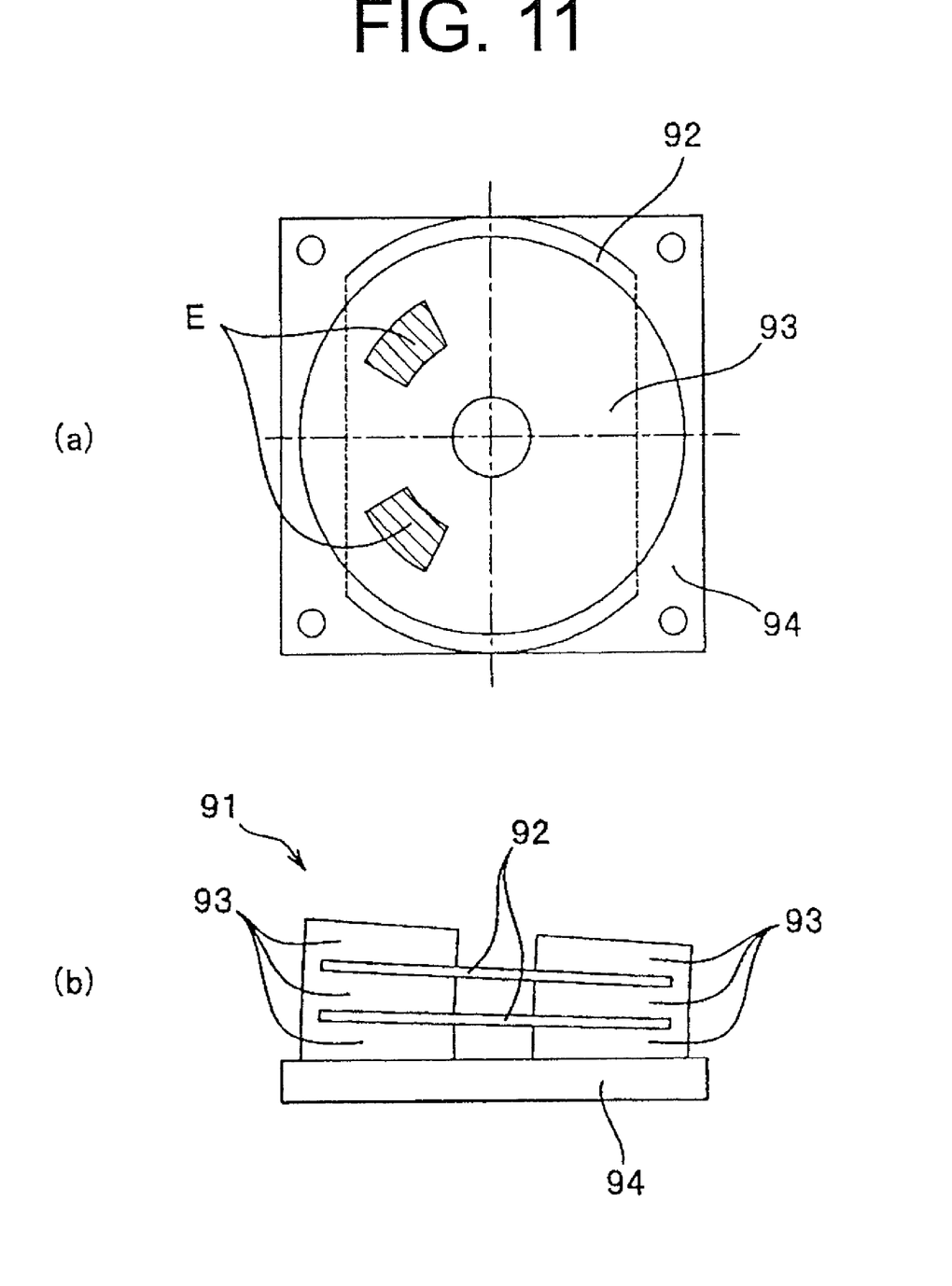

With this structure, when a laminated structure 91 formed using hardplates 92 of the invention is deformed into an accordion shape as shown in FIG. 11(b), regions at peak positions "E" of the internal stress are dispersed and moved as shown in FIG. 11(a) to the regions in the circumferential direction in which expansion or compression is small from the regions indicated by the "A" areas in FIG. 10(a) where expansion or compression is large. Additionally, the peak value of the internal stress generated at the peak positions "E" is smaller than the peak value of the internal stress generated in the "A" areas shown in FIG. 10(a).

Thus, along with a decrease in the peak value of the internal stress, the level of the internal stress generated at the peak positions "E" is reduced, thereby preventing generation of cracks. The prevention of generation of cracks results in prevention of breaking or the like of each rubber layer 93.

Note that the results illustrated in FIG. 11 are obtained as a result of operation using a finite element method, as with the results illustrated in FIG. 10. FIG. 11(b) shows the structure of the substantial part of the laminated structure 91 on the side of a rigid end member 94.

The shape of each rubber layer in plan view may be analogous to the shape of each hard plate 92. With this structure, the amount of rubber to be used in the rubber spring device can be reduced while a function substantially the same as that of each rubber layer 93 having a circular shape can be exerted as shown in FIG. 11.

The thicknesses of the plurality of rubber layers constituting the rubber spring device may be uniformly formed, or may be formed at unequal intervals. When the thicknesses of the rubber layers are formed at unequal intervals, the thicknesses may be formed to gradually decrease stepwise from the thickness on one end side toward the thickness on the other end side in the rubber spring device. With this structure, a variation in the stress generated in each rubber layer in the vertical direction of the rubber spring device can be reduced.

Further, the rubber spring device of the invention can be applied to an articulated dump truck as an off-road truck.

BEST MODE FOR CARRYING OUT THE INVENTION

Preferred embodiments of the invention will be described in detail below with reference to the accompanying drawings. The structure of a rubber spring device according to the invention and the layout structure of the rubber spring device in a dump truck are not limited to the shape and layout structure described below, but any shape and layout structure can be employed as long as the shape and layout structure can solve the problems to be solved by the invention. Accordingly, the invention is not limited to embodiments described below, but may be modified in various manners.

Further, a structural example in which the rubber spring device is used as a suspension for an articulated dump truck will be described below. However, the rubber spring device of the invention can be used not only as a suspension for an articulated dump truck, but also as a suspension for an off-road truck or the like.

Embodiments

Figure 1:
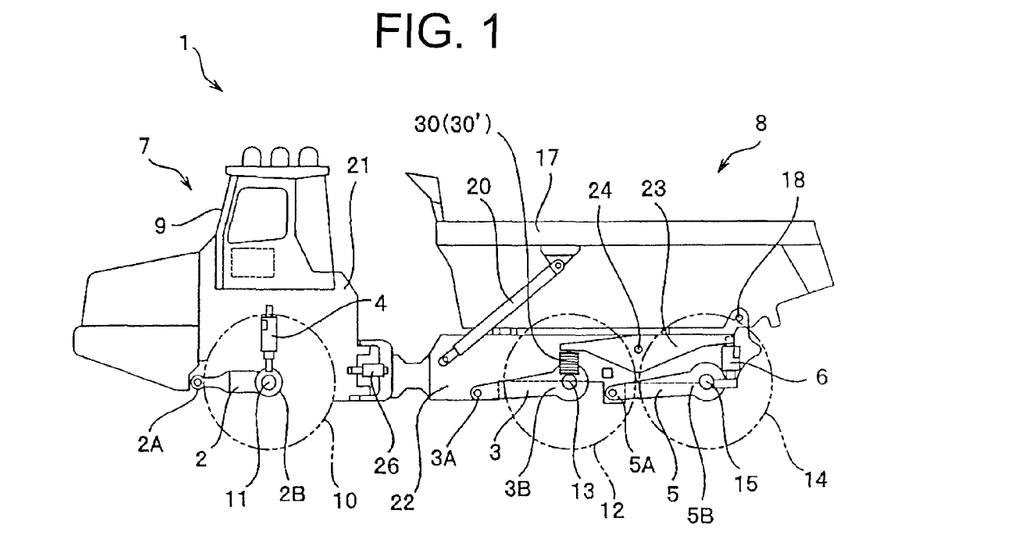
FIG. 1 is a side view of a dump truck. (Embodiment)
Figure 2:
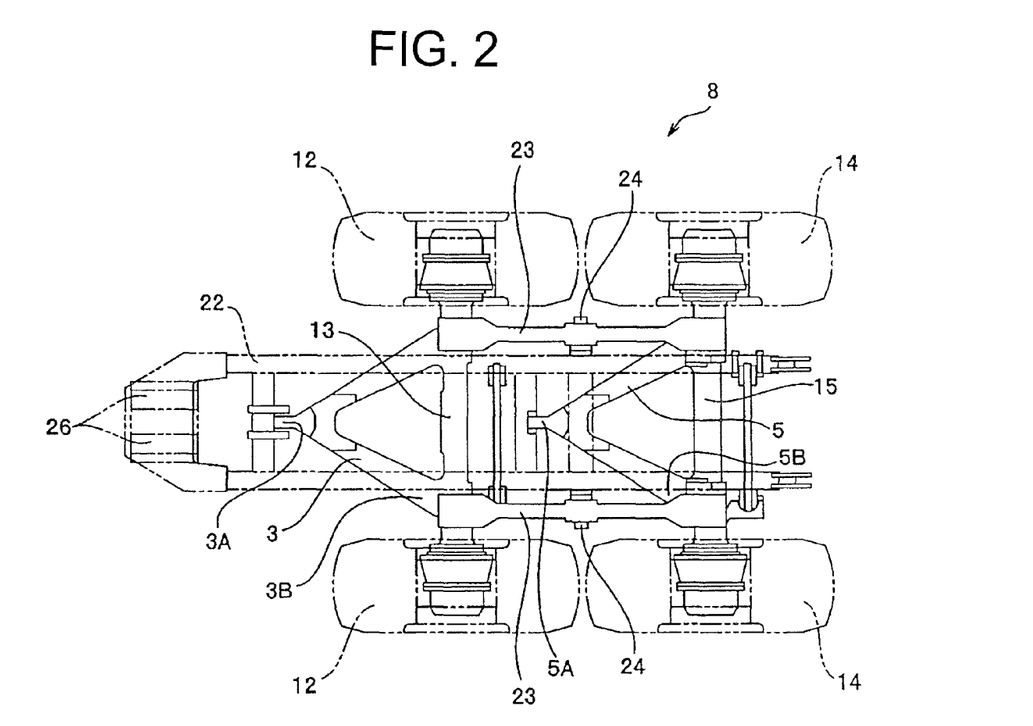
FIG. 2 is an enlarged plan view of a rear frame. (Embodiment)

FIG. 1 shows a side view of an articulated dump truck (hereinafter, referred to as "dump truck"). FIG. 2 shows a plan view of a rear frame 22 in a state where a vessel 17 or the like are omitted. As shown in FIG. 1, a dump truck 1 includes a front vehicle body 7 positioned on the front side and a rear vehicle body 8 positioned on the rear side. The dump truck 1 also includes front wheels 10, middle wheels 12, and rear wheels 14.

The front vehicle body 7 including the front wheels 10 is supported by a front frame 21. The front frame 21 is mounted with a driver's cabin 9. The rear vehicle body 8 including the middle wheels 12 and the rear wheels 14 is supported by a rear frame 22 that is connected to the front frame 21 so as to be bendable and swingable with respect to the front frame 21.

A right and left pair of steering cylinders 26, 26 are provided spanning between the front frame 21 and the rear frame 22. By respectively expanding or contracting the steering cylinders 26, 26, the rear frame 22 can be bent with respect to the front frame 21, and hence a steering operation of the dump truck 1 can be performed.

The vessel 17 for loading a cargo, such as sand, for example, is provided on top of the rear frame 22. A pair of lift cylinders 20, 20 are provided between the right and left sides of the front portion of the vessel 17 and the rear frame 22. The vessel 17 is attached rotatably to the rear frame 22 by means of vessel pins 18 which are disposed below the rear portion of the vessel 17.

By expanding or contracting the pair of lift cylinders 20, 20, the vessel 17 can be rotated in the vertical direction about the vessel pins 18. When the vessel 17 is raised up, the operation called "dumping up" can be carried out, and when the vessel 17 is lowered, the operation called "dumping down" can be carried out. FIG. 1 shows a state where the vessel 17 has been lowered and is seated on the rear frame 22.

A front arm 2 which is V-shaped in plan view is supported rotatably on the front frame 21. A front end portion 2A of the front arm 2 (namely, the apex of the V shape in plan view) is supported on the lower portion of the front frame 21 so as to be rotatable in the vertical direction.

A front axle 11 that supports the pair of right and left front wheels 10, 10 is attached to both end surfaces on the side of a rear end portion 2B of the front arm 2. One end portion of a front suspension cylinder 4 is supported on the front axle 11, and the other end portion of the front suspension cylinder 4 is supported on the front frame 21.

As illustrated in FIGS. 1 and 2, a right and left pair of equalizer bars 23, 23 are provided rotatably on both side surfaces of the rear frame 22. Approximate center portions of the equalizer bars 23, 23 are each attached rotatably to the rear frame 22 by means of pins 24, 24. Below the rear frame 22, a center arm 3 and a rear arm 5 are each supported rotatably on the rear frame 22. The center arm 3 and the rear arm 5 are each formed in a V shape in plan view, like the front arm 2.

A front end portion 3A of the center arm 3 is supported rotatably in the vertical direction on the lower front side of the rear frame 22. A center axle 13 that supports the pair of right and left middle wheels 12, 12 is attached to both end surfaces at a rear end portion 3B of the center arm 3. One end of a rubber spring device 30 is supported on the center axle 13, and the other end of each of rubber spring devices 30, 30' is supported on the front end side of the equalizer bars 23, 23.

A front end portion 5A of the rear arm 5 is supported rotatably in the vertical direction on the lower rear side of the rear frame 22. A rear axle 15 that supports the right and left pair of rear wheels 14, 14 is attached to both end surfaces at a rear end portion 5B of the rear arm 5. One end of a rear suspension cylinder 6 is supported on the rear end portion 5B or the rear axle 15, and the other end of the rear suspension cylinder 6 is supported on the rear end side of each equalizer bar 23.

Figure 3:
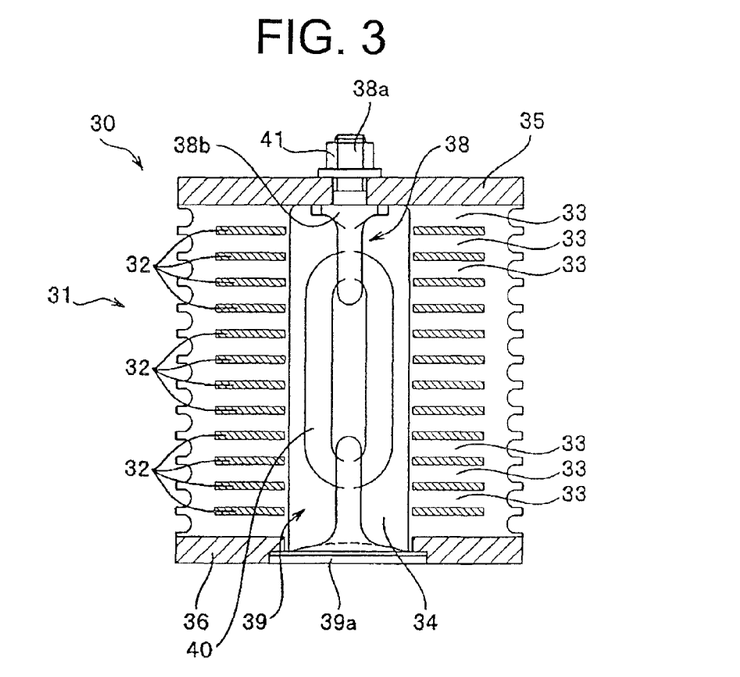
FIG. 3 is a longitudinal sectional view of a rubber spring device. (Embodiment)
Figure 4:
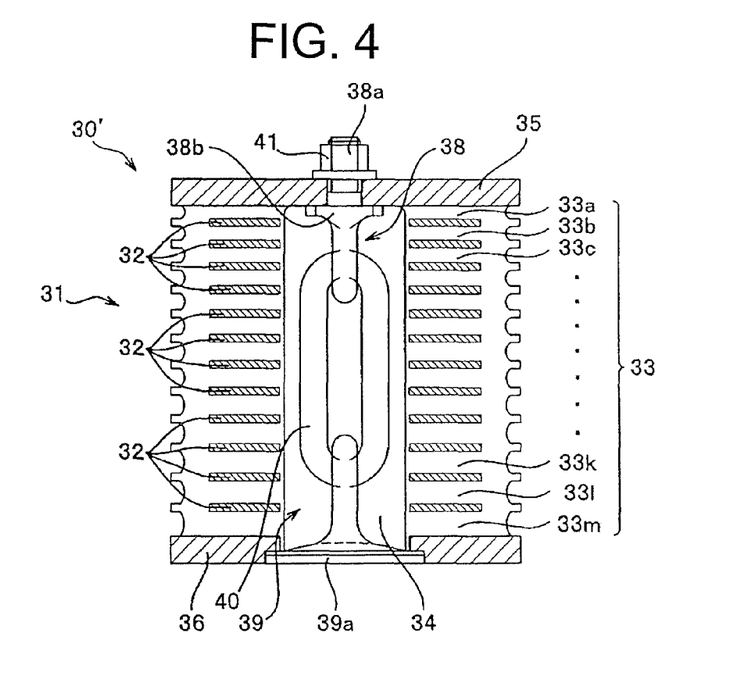
FIG. 4 is a longitudinal sectional view of another rubber spring device. (Embodiment)
FIG. 5 are a top view, a front view, a bottom view, and a side view of a rubber spring device. (Embodiment)
FIG. 6 are a top view, a front view, a bottom view, and a side view of another rubber spring device. (Embodiment)

FIGS. 3 and 4 show longitudinal sectional views of the rubber spring devices 30, 30' in a non-load state. The rubber spring devices 30, 30' constitute a laminated structure 31 which is obtained by alternately laminating a plurality of hard plates 32 with rigidity and rubber layers 33 made of rubber. A columnar cavity portion 34 penetrating in the laminating direction is formed in a central portion of the laminated structure 31.

The rubber layers 33a, 33m disposed at both ends of the laminated structure 31 are respectively bonded to rigid end members 35, 36. In the non-load state, the hard plates 32 and the rigid end members 35, 36 are disposed in parallel to each other. Further, connecting means composed of U-shaped latches 38, 39, which are connected with a chain link 40, is disposed in the cavity portion 34 between the pair of rigid end members 35, 36. The laminated structure 31, the pair of rigid end members 35, 36, which are respectively bonded to the both ends of the laminated structure 31, and the connecting means constitute the rubber spring devices 30, 30'.

Although the structure in which the columnar cavity portion 34 penetrating in the laminating direction is formed in the central portion of the laminated structure 31 is described, a structure in which the cavity portion 34 is not formed in the central portion of the laminated structure 31 can also be employed. In this case, the connecting means is structured to be embedded in each rubber layer 33.

The rigid end member 36 has a stepped through hole having an inner diameter substantially matching the cavity portion 34 of the laminated structure 31. A flange portion 39a of the U-shaped latch 39 can be brought into contact with the stepped hole formed in the rigid end member 36. Further, a bolt portion 38a of the latch 38 is allowed to penetrate through a hole formed in the rigid end member 35 and is screwed with a nut 41 on the outer surface side of the rigid end member 35. This allows the flange portion 38b of the U-shaped latch 38 to come into contact with the internal surface side of the hole formed in the rigid end member 35, and allows the connecting means to regulate widening of the interval between the pair of rigid end members 35, 36 to be less than a predetermined interval.

Although the structure composed of the chain link 40 and the U-shaped latches 38, 39 is described as the structure of the connecting means, any other structure may be employed as long as the structure is capable of regulating widening of the interval between the pair of rigid end members 35, 36. For example, it is possible to employ a structure in which a rod penetrating through the pair of rigid end members 35, 36 is used to regulate widening of the interval between the pair of rigid end members 35, 36.

The rubber spring device 30 shown in FIG. 3 has a structure in which the hard plates 32 are disposed at substantially equal intervals. The rubber spring device 30' shown in FIG. 4 has a structure in which the hard plates 32 are disposed at unequal intervals. In the structure in which the hardplates are disposed at unequal intervals, the rubber layer 33m disposed on the side of the rigid end member 36 is formed with a greater thickness, and the rubber layer 33a disposed on the side of the rigid end member 35 is formed with a thickness smaller than the thickness of the rubber layer 33m.

The rubber layers 33a to 33m in the middle portion of the laminated structure 31 are formed to gradually decrease in thickness stepwise from the rigid end member 36 side toward the rigid end member 35 side, i.e., from the thickness of the rubber layer 33m disposed on the rigid end member 36 side toward the thickness of the rubber layer 33a disposed on the rigid end member 35 side.

Note that the thickness of the rubber layer disposed on the rigid end member 36 side is not limited to such a structure that only the rubber layer 33m has a greater thickness, but the rubber layers 33l, 33k, or the like which are laminated on the top of the rubber layer 33m may have a greater thickness, like the rubber layer 33m. Similarly, the thickness of the rubber layer disposed on the rigid end member 35 side is not limited to such a structure that only the rubber layer 33a has a smaller thickness, but the rubber layers 33b, 33c, or the like which are laminated below the rubber layer 33a may also have a smaller thickness, like the rubber layer 33a.

The rubber layers in the middle portion of the laminated structure 31 are formed to gradually decrease in thickness stepwise as the rubber layers are laminated from the rigid end member 36 side toward the rigid end member 35 side, i.e., from the thickness on the rigid end member 36 side toward the thickness on the rigid end member 35 side.

The number of rubber layers in the rubber spring devices 30, 30' shown in FIGS. 3 and 4 is illustrative only. The invention is not limited to the number of rubber layers illustrated.

A hole portion formed in the central portion of each hard plate 32 has dimension slightly larger than those of the cavity portion 34. The material and shape of the hard plates 32 are uniformly formed in the vertical direction. However, the material and thickness of the hard plates can be decided in consideration of a maximum stress or the like of the rubber spring devices 30, 30'.

The inner peripheral surface of the laminated structure 31 facing the cavity portion 34 is covered with rubber so as to prevent the buried hard plates 32 from being exposed to the cavity portion 34 side.

The outer peripheral edge of each rubber layer 33 can be disposed further inside or outside the outer peripheral edge of each hard plate 32. When the outer peripheral edge of each rubber layer 33 is disposed further inside the outer peripheral edge of each hard plate 32, the rubber spring device 30 is compressed, so that even when each rubber layer 33 is swelled to the outer peripheral side, the swelled rubber layer can be prevented from protruding to the outer peripheral side to a large extent from the outer peripheral edge of each hard plate 32.

When the outer peripheral edge of each rubber layer 33 is disposed outside the outer peripheral edge of each hard plate 32, the laminated structure 31 can be covered with rubber so that each hard plate 32 is included. Further, the upper and lower rubber layers 33 sandwiching each hard plate 32 can be connected together with rubber, and thus an area of load in each rubber layer can be increased when the rubber spring devices 30, 30' are deformed into an accordion shape or the like.

Figure 5:
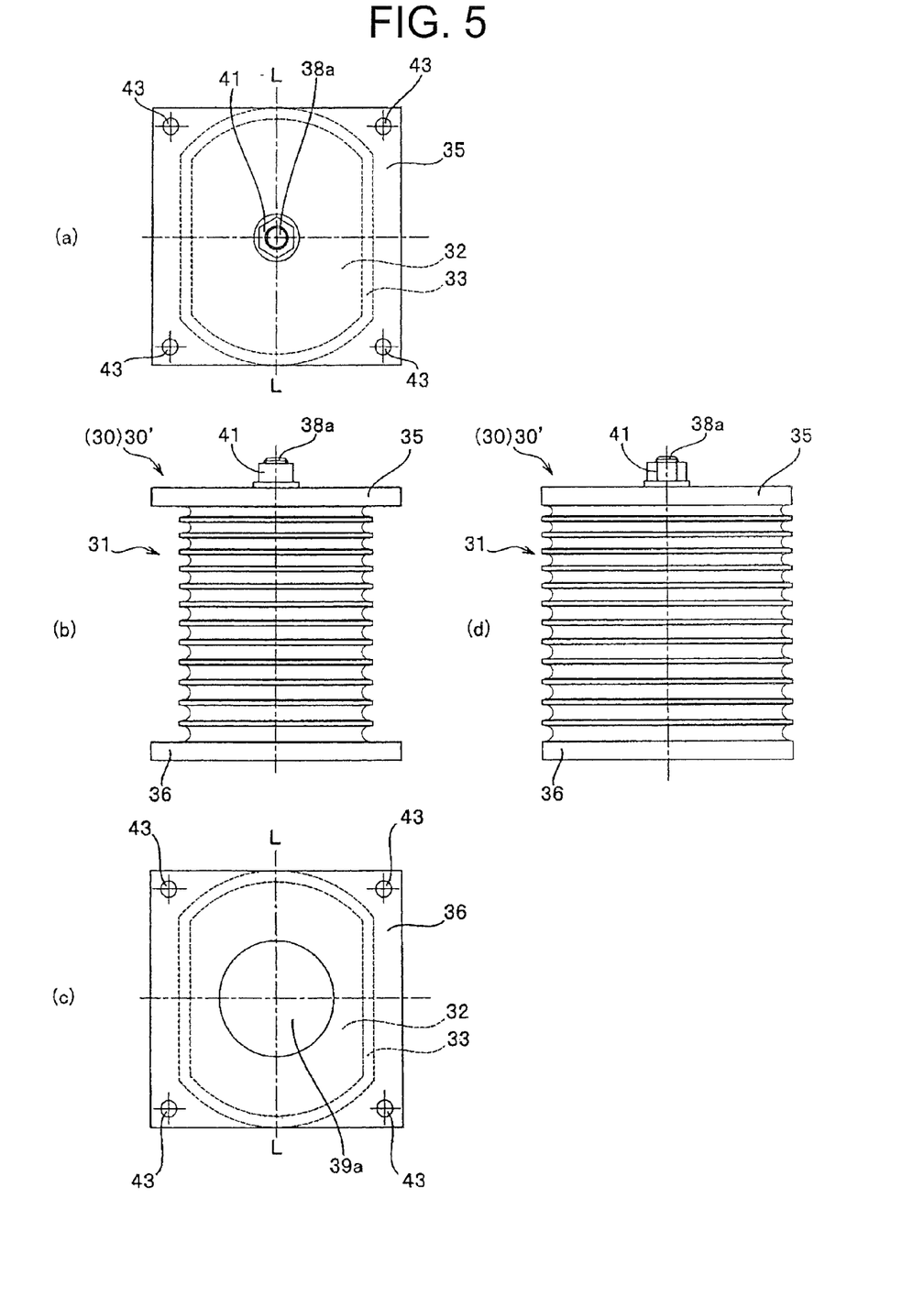
Figure 6:
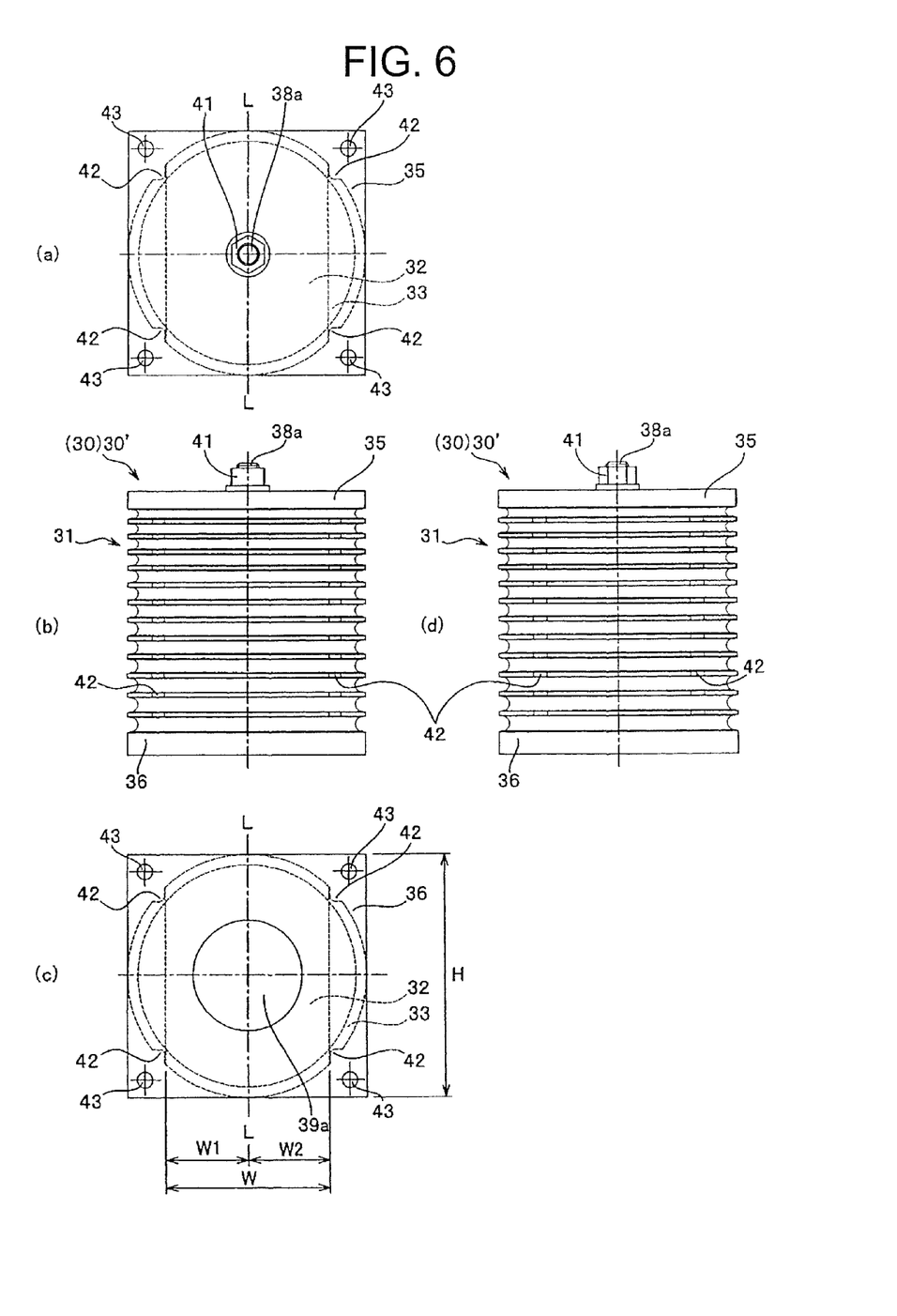

The planar shape of each hard plate 32 is shown in FIGS. 5(*a*) and 6(*a*). In particular, as shown in FIG. 6(*c*), the linear dimension of each hard plate is set as follows. That is, a linear dimension W of each hard plate 32 in the direction parallel to the longitudinal direction of each equalizer bar 23 in the dump truck 1 is shorter than a linear dimension H of each hard plate 32 in the direction parallel to the axle direction of the dump truck 1. That is, the dimensions are set so as to satisfy the relation H>W.

A central line L-L that divides the laminated structure 31 in two is formed to pass within the linear dimension W of each hard plate 32. As a result, the hard plates 32 can be disposed on the right and left sides of the central line L-L.

FIG. 5 show a structural example in which the planar shape of each rubber layer 33 covering each hard plate 32 is analogous to the planar shape of each hard plate 32. FIG. 6 show a structural example in which the planar shape of each rubber layer 33 covering each hard plate 32 is a circular shape.

Note that FIGS. 5(*a*) and 6(*a*) are top views of the rubber spring devices 30, 30', and FIGS. 5(*b*) and 6(*b*) are front views of the rubber spring devices 30, 30'. FIGS. 5(*c*) and 6(*c*) are bottom views of the rubber spring devices 30, 30', and FIGS. 5(*d*) and 6(*d*) are side views of the rubber spring devices 30, 30'.

In FIGS. 5(*a*) and (*c*) and FIGS. 6(*a*) and (*c*), areas denoted by reference numeral 43 at four corners of the rigid end members 35, 36 indicate bolt insertion holes for respectively fixing the rigid end members 35, 36 to end portions of the center axle 13 and the equalizer bars 23. Each hard plate 32 is formed in a symmetrical shape with the central line L-L as a center.

Figure 7:
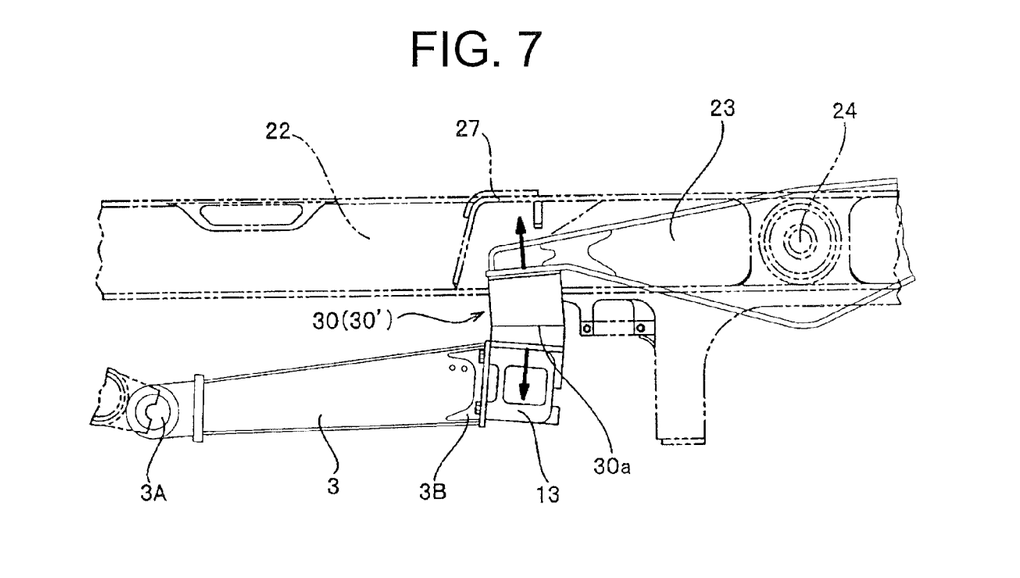
FIG. 7 is an enlarged side view of the vicinity of a rubber spring device when the rubber spring device is deformed. Embodiment
Figure 8:
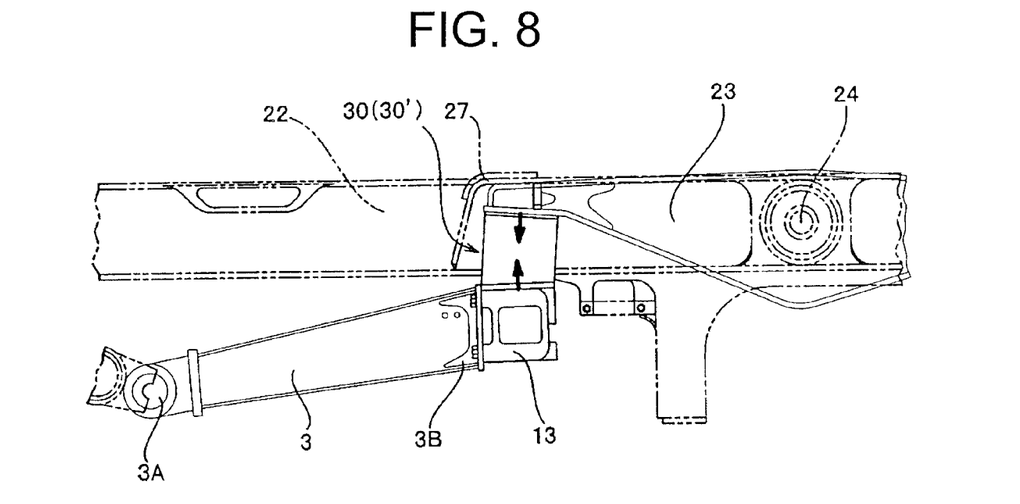
FIG. 8 is an enlarged side view of the vicinity of a rubber spring device when the rubber spring device is deformed in another way. (Embodiment)

When the stress levels on the front side and the rear side of each rubber layer 33 are different from each other due to the dimensions or the like of the link composed of the center arm 3 and the equalizer bars 23 with the rubber spring devices 30, 30' shown in FIGS. 7 and 8 as a center, there is no need to form each hard plate 32 into a symmetrical shape with the central line L-L as a center.

Specifically, the case where the stress levels on the front side and the rear side of each rubber layer 33 are different from each other will be described with reference to FIG. 6(*c*).

The width dimension of each hard plate 32 in the horizontal direction with the central line L-L as a center can be set to satisfy the relation W1≠W2. For example, in a state where the peak value of the stress level on the front side of each rubber layer 33 in the front-back direction of the vehicle, i.e., in the width direction of each hard plate 32 is high, the dimension of W1 can be set to be shorter, i.e., to satisfy the relation W2≧W1. By setting the dimension of W1 to be shorter, the peak value of the stress level on the front side of each rubber layer 33 can be decreased.

Further, when the peak value of the stress level on the front side of each rubber layer 33 is high, while the peak value of the stress level on the rear side of each rubber layer 33 is low, it is also possible to set the dimension of W2 to be extended to the outer peripheral edge of each rubber layer 33.

Four recesses 42 shown in FIG. 6 are formed at the outer peripheral edge of each rubber layer 33 so as to position each hard plate 32 upon manufacturing of the laminated structure 31.

FIGS. 5 and 6 show a structure in which each hard plate 32 is entirely covered with each rubber layer 33. However, a structure in which each hard plate 32 has an outer peripheral shape of the same size as that of each rubber layer 33, or a structure in which each hard plate 32 has an outer peripheral shape larger than that of each rubber layer 33 may also be employed.

FIGS. 7 and 8 show partially enlarged side views of the center arm 3 and each equalizer bar 23 with the rubber spring devices 30, 30' as a center. FIG. 7 shows a state where the both middle wheels 12 at the center axle 13 are dropped and a tensile load is applied to the rubber spring device 30. FIG. 8 shows a state where the both middle wheels 12 (see FIG. 1) at the center axle 13 run on a small mound or the like and a compressive load is applied to the rubber spring device 30.

The rubber spring devices 30, 30' are disposed between the center axle 13 and an end portion of each equalizer bar 23. The direction of the central line L-L in each hard plate 32 shown in FIGS. 5(*a*) and 6(*a*), i.e., the direction of the linear dimension H in each hard plate 32 is set to be in parallel to the axial direction of the center axle 13. In other words, the direction of the linear dimension W of each hard plate 32 shown in FIGS. 5(*a*) and 6(*a*) is set as a direction in parallel to the longitudinal direction of the equalizer bars 23.

As shown in FIGS. 7 and 8, on both side surfaces of the rear frame 22, stoppers 27 are respectively provided to the front end portion and the rear end portion of each equalizer bar 23 so as to respectively correspond to the front and rear end portions. The stoppers 27 regulate the amount of rotation of each equalizer bar 23. Note that illustration of the stopper disposed in the rear end portion is omitted. The stoppers disposed in the front end portion and the rear end portion are formed into a shape slightly protruding from the side surface of the rear frame 22 toward each equalizer bar 23.

FIG. 7 shows a state in which the dump truck 1 shown in FIG. 1 is supported by the front wheels 10 and the rear wheels 14 and the middle wheels 12 are floating in an upper portion such as a dent. In this state, the center arm 3 rotates clockwise as shown in the figure, and the rear end portion of each equalizer bar 23 comes into contact with the stopper which is not shown, thereby regulating a counterclockwise rotation, as shown in the figure, of each equalizer bar 23 by a predetermined amount or more. At this time, the connecting means regulates the interval between the pair of rigid end members 35, 36, so that a tensile load acts on the rubber spring devices 30, 30' in directions indicated by arrows.

The members (the equalizer bars 23 and the center axle 13) mounted with the rigid end members 35, 36 have different rotation centers (i.e., the pin 24 for each equalizer bar 23, and the front end portion 3A for the center axle 13). Therefore, the rubber spring devices 30, 30' are deformed into an accordion shape as shown in FIG. 7.

Since the interval between the rigid end members 35, 36 is regulated to be a predetermined interval or less by the connecting means, the front side portion of the dump truck 1 in the rubber spring devices 30, 30' is compressed and deformed, and the rear side portion of the dump truck 1 in the rubber spring devices 30, 30' is pulled and deformed. Accordingly, as shown in FIG. 7, the rubber spring devices 30, 30' are deformed into an accordion shape with a folded portion at a line 30a in the lateral direction on the lower end side of the rubber spring devices 30, 30'.

Further, when the middle wheels 12 run on a small mound or the like, as shown in FIG. 8, the center arm 3 rotates counterclockwise as shown in the figure, and the front end portion of each equalizer bar 23 comes into contact with each stopper 27, thereby regulating a clockwise rotation, as shown in the figure, of each equalizer bar 23 by a predetermined amount or more. Accordingly, compressive loads indicated by arrows act on the rubber spring devices 30, 30'.

The members (the equalizer bars 23 and the center axle 13) mounted with the rigid end members 35, 36 have different rotation centers (i.e., the pin 24 for each equalizer bar 23, and the front end portion 3A for the center axle 13). Therefore, the rubber spring devices 30, 30' are deformed into an accordion shape opposite to that shown in FIG. 7. For this reason, each layer of the rubber spring devices 30, 30' is not uniformly compressed, but the rear side portion is compressed and deformed to a larger extent than the front side portion.

Thus, as a deformation of the rubber spring devices 30, 30' during travelling of the dump truck 1, a deformation into an accordion shape is generated in many cases. The magnitude of the internal stress generated in each rubber layer when the rubber spring device is deformed into an accordion shape will be subsequently described with reference to FIGS. 10 and 11.

FIG. 10 show analysis results using a finite element method as a pressure distribution within each rubber layer 83 in the case where the hard plates 82 each having a disc shape as disclosed in the related art are used. FIG. 11 show analysis results using a finite element method as a pressure distribution within each rubber layer 93 in the case where the hard plates 92 according to the invention are used.

The following description referring to FIGS. 10 and 11 partially overlaps the above description in the "PROBLEMS TO BE SOLVED BY THE INVENTION" section and the "EFFECTS OF THE INVENTION" section.

The conventional off-road dump truck is in the state shown in FIG. 10(b). Specifically, when the rubber spring device is deformed into an accordion shape, internal stress peaks occur in the regions of the "A" areas as shown in FIG. 10(a). Further, the cracks D are generated in the middle portion in the radial direction of each rubber layer 83.

Thus, it is obvious that in the regions of the "A" areas, the origins of the cracks generated in each rubber layer 83 are concentrated. When the middle wheel 12 on one side and the rear wheel 14 on the other side in the horizontal direction of the vehicle (see FIG. 1) run on a block disposed on a road, maximum expansion or maximum compression is generated in locations indicated by the regions of "B" areas in each rubber layer 83. Further, when the right and left middle wheels or the right and left rear wheels run on the block, maximum expansion or maximum compression is generated in locations indicated by the regions of "C" areas in each rubber layer 83.

On the other hand, the off-road dump truck according to the invention is in the state shown in FIG. 11. Specifically, when the rubber spring devices 30, 30' are deformed into an accordion shape, the regions at the peak positions "E" of the internal stress are dispersed and moved as shown in FIG. 11(a) to the regions in the circumferential direction in which expansion or compression is small from the regions where expansion or compression is large as indicated by the "A" areas in FIG. 10(a). Additionally, the peak value of the internal stress generated at the peak positions "E" is smaller than the peak value of the internal stress generated in the "A" areas shown in FIG. 10(a).

Then, along with a decrease in the peak value of the internal stress, the level of the internal stress generated at the peak positions "E" is reduced, thereby preventing generation of cracks. The prevention of generation of cracks results in prevention of breaking or the like of each rubber layer 93.

A maximum interval between the outer peripheral edges of the adjacent hard plates 92 when the laminated structure 91 is deformed into an accordion shape is smaller than a maximum interval between the outer peripheral edges between the adjacent hard plates 82 when the laminated structure 81 is deformed into an accordion shape. Accordingly, a tensile force acting on each rubber layer 93 at the maximum interval between the outer peripheral edges of the adjacent hard plates 92 as shown in FIG. 11 is smaller than a tensile force acting on each rubber layer 83 at the maximum interval between the outer peripheral edges of the adjacent hard plates 82 as shown in FIGS. 10. Therefore, the internal stress generated in the middle portion in the radial direction of each rubber layer 93 is smaller than the internal stress generated in the middle portion in the radial direction of each rubber layer 83.

Thus, the invention can prevent generation of cracks, thereby preventing breaking or the like of each rubber layer 93.

FIGS. 5 and 6 illustrate shapes obtained by cutting both sides of a circular shape in plan view as the shape of each hard plate 92. However, the shape of the hard plate 92 is not limited to the shapes shown in FIGS. 5 and 6. Any shape such as an oval shape, a cocoon shape, or an elliptic shape can be adopted as long as the shape has dimensions in which the width dimension in the longitudinal direction is longer than the width dimension in the traverse direction.

Generally, assuming that the long-axis length is represented by "a" and the short-axis length is represented by "b" in an X-Y coordinate, an elliptic shape can be expressed as the relation $(X/a)^2+(y/b)^2=1$. A hyperelliptic shape presented by a real number equal to or greater than "2" and smaller than "3" as an index value instead of the index "2", such as a shape expressed as $(x/a)^{2.7}+(y/b)^{2.7}=1$, can also be included in the elliptical shape according to the invention.

Referring to FIG. 6(c), when the stress levels on the front side and the rear side of each rubber layer 33 are different from each other, the width dimension of each hard plate 32 in the horizontal direction with the central line L-L as a center may be set to satisfy the relation $W1 \neq W2$.

In the above description, the structure in which the rubber spring devices 30, 30' are supported between the center axle 13 and the equalizer bars 23, 23 has been described. However, the layout structure of the rubber spring devices 30, 30' may be used instead of the rear suspension cylinder 6 shown in FIG. 1.

That is, the rubber spring devices 30, 30' may be supported between the rear axle 15 and each equalizer bar 23.

Industrial Applicability

According the invention, the technical idea of the invention can be applied to devices or the like to which the technical idea of the invention can be applied.

DESCRIPTION OF REFERENCE NUMERALS

1 ... DUMP TRUCK, 2 ... FRONT ARM, 3 ... CENTER ARM, 5 ... REAR ARM, 10 ... FRONT WHEEL, 11 ... FRONT AXLE, 12 ... MIDDLE WHEEL, 13 ... CENTER AXLE, 14 ... REAR WHEEL, 15 ... REAR AXLE, 21 ... FRONT FRAME, 22 ... REAR FRAME, 23 ... EQUALIZER BAR, 26 ... STEERING CYLINDER, 30, 30' ... RUBBER SPRING DEVICE, 31 ... LAMINATED STRUCTURE, 32 ... HARD PLATE, 33 ... RUBBER LAYER, 50 ... RUBBER SPRING DEVICE, 51 ... LAMINATED STRUCTURE, 52 ... HARD PLATE, 53 ... RUBBER LAYER, 81 ... LAMINATED STRUCTURE, 82 ... HARD PLATE, 83 ... RUBBER LAYER, 84 ... RIGID END MEMBER, 91 ... LAMINATED STRUCTURE, 92 ... HARD PLATE, 93 ... RUBBER LAYER, 94 ... RIGID END MEMBER, D ... CRACK, L ... CENTRAL LINE, H ... LINEAR DIMENSION, W ... LINEAR DIMENSION, W1, W2 ... DIMENSION IN TRAVERSE DIRECTION FROM CENTRAL LINE.

The invention claimed is:

1. An off-road truck suspended with a rubber spring device for suspension between an equalizer bar and an axle, the rubber spring device comprising:
   a laminated structure formed by alternately laminating a plurality of layers of rubber layers and hard plates with rigidity in parallel to each other; a pair of rigid end members respectively bonded to the rubber layers disposed at both ends of the laminated structure; and connecting means for regulating widening of an interval between the rigid end members, wherein
   in plan view, each of the hard plates in a direction parallel to a longitudinal direction of the equalizer bar is formed to have a linear dimension that is shorter than a linear dimension of each of the hard plates in a direction parallel to an axle direction of the off-road truck, and
   in plan view, a central line that divides the laminated structure in two disposed in parallel to the axle direction passes through the hard plates.

2. The off-road truck suspended with the rubber spring device according to claim 1, wherein an outer peripheral shape of each of the rubber layers in plan view is analogous to an outer peripheral shape of each of the hard plates.

3. The off-road truck suspended with the rubber spring device according to claim 2, wherein
   a rubber layer disposed on one end of the laminated structure is formed to have a thickness greater than that of a rubber layer disposed on the other end, and
   each of the rubber layers in a middle portion of the laminated structure is formed to gradually decrease in thickness stepwise from a thickness on the one end side toward a thickness on the other end side.

4. The off-road truck suspended with the rubber spring device according to claim 2, wherein each of the rubber layers in the laminated structure is formed to have the same thickness.

5. The off-road truck suspended with the rubber spring device according to claim 2, wherein the off-road truck is an articulated dump truck.

6. The off-road truck suspended with the rubber spring device according to claim 1, wherein
   a rubber layer disposed on one end of the laminated structure is formed to have a thickness greater than that of a rubber layer disposed on the other end, and
   each of the rubber layers in a middle portion of the laminated structure is formed to gradually decrease in thickness stepwise from a thickness on the one end side toward a thickness on the other end side.

7. The off-road truck suspended with the rubber spring device according to claim 6, wherein the off-road truck is an articulated dump truck.

8. The off-road truck suspended with the rubber spring device according to claim 1, wherein each of the rubber layers in the laminated structure is formed to have the same thickness.

9. The off-road truck suspended with the rubber spring device according to claim 8, wherein the off-road truck is an articulated dump truck.

10. The off-road truck suspended with the rubber spring device according to claim 1, wherein the off-road truck is an articulated dump truck.

* * * * *